United States Patent
Zhang et al.

(10) Patent No.: US 11,914,068 B2
(45) Date of Patent: Feb. 27, 2024

(54) RADAR RANGING SYSTEM BASED ON TRUE RANDOM GENERATOR AND RANGING METHOD THEREOF

(71) Applicant: Taiyuan University of Technology, Taiyuan (CN)

(72) Inventors: Jianguo Zhang, Taiyuan (CN); Rui Hou, Taiyuan (CN); Hang Xu, Taiyuan (CN); Li Liu, Taiyuan (CN); Zhiwei Jia, Taiyuan (CN); Yuncai Wang, Taiyuan (CN)

(73) Assignee: Taiyuan University of Technology, Taiyuan (CN)

( * ) Notice: Subject to any disclaimer, the term of this patent is extended or adjusted under 35 U.S.C. 154(b) by 406 days.

(21) Appl. No.: 17/471,270

(22) Filed: Sep. 10, 2021

(65) Prior Publication Data
US 2022/0283267 A1 Sep. 8, 2022

(30) Foreign Application Priority Data
Sep. 11, 2020 (CN) .......................... 202010956272.4

(51) Int. Cl.
*G01S 7/35* (2006.01)
*G01S 13/32* (2006.01)
*G01S 13/931* (2020.01)

(52) U.S. Cl.
CPC .............. *G01S 7/35* (2013.01); *G01S 13/32* (2013.01); *G01S 13/931* (2013.01)

(58) Field of Classification Search
None
See application file for complete search history.

(56) References Cited

U.S. PATENT DOCUMENTS

| 5,325,095 A * | 6/1994 | Vadnais | G01S 13/32 342/194 |
| 2017/0131394 A1* | 5/2017 | Roger | G01S 13/343 |

(Continued)

OTHER PUBLICATIONS

H. J. Ng, R. Feger and A. Stelzer, "A Fully-Integrated 77-GHz UWB Pseudo-Random Noise Radar Transceiver With a Programmable Sequence Generator in SiGe Technology," in IEEE Transactions on Circuits and Systems I: Regular Papers, vol. 61, No. 8, pp. 2444-2455, Aug. 2014, doi: 10.1109/TCSI.2014.2309774. (Year: 2014).*

(Continued)

*Primary Examiner* — Raymond L Nimox
(74) *Attorney, Agent, or Firm* — Bochner PLLC; Andrew D. Bochner

(57) ABSTRACT

The present disclosure relates to a radar ranging system based on a true random generator and a ranging method thereof The present disclosure adopts the following technical scheme: the system comprises a radar signal modulation and transmission unit and a radar signal receiving and processing unit, wherein the radar signal modulation and transmission unit inputs and stores a true random binary sequence generated by the true random generator in a memory, and cyclically outputs the true random binary sequence to a BPSK modulator for phase modulation. The receiving and amplifying unit receives the reflected radar signal. The down-sampling unit down samples the intermediate frequency signal generated by the mixers. The data processing unit converts the sampled analog signal into a digital signal and cross-correlates the signal with the true random binary sequence in the memory, so as to obtain the distance to the object side to be measured.

9 Claims, 5 Drawing Sheets

(56) References Cited

U.S. PATENT DOCUMENTS

2017/0307728 A1*  10/2017  Eshraghi ................. G01S 7/282
2017/0307729 A1*  10/2017  Eshraghi ............... G01S 7/2813
2019/0129004 A1*   5/2019  Jaeger ...................... G01S 7/03

OTHER PUBLICATIONS

H. J. Ng, R. Feger and A. Stelzer, "A fully-integrated 77-GHz pseudo-random noise coded Doppler radar sensor with programmable sequence generators in SiGe technology," 2014 IEEE MTT-S International Microwave Symposium (IMS2014), Tampa, FL, USA, 2014, pp. 1-4, doi: 10.1109/MWSYM.2014.6848382. (Year: 2014).*

* cited by examiner

RADAR RANGING SYSTEM BASED ON TRUE RANDOM GENERATOR AND RANGING METHOD THEREOF

CROSS REFERENCE TO RELATED APPLICATION(S)

This patent application claims the benefit and priority of Chinese Patent Application No. 202010956272.4, filed on Sep. 11, 2020, the disclosure of which is incorporated by reference herein in its entirety as part of the present application.

TECHNICAL FIELD

The present disclosure relates to a radar ranging system based on a true random generator and a ranging method thereof, which pertains to the technical field of radar ranging systems and ranging methods thereof.

BACKGROUND ART

With the continuous pursuit of comfortable and safe driving experience and the development of automobile technologies, automatic driving has become a new direction of automobile development. Traditional laser radar and infrared radar have low accuracy in foggy days, sand-dust weather, and other weathers, while millimeter wave radar is more and more widely used in automobile aided driving or automatic driving due to its all-weather operation characteristics. The 76.5 GHZ band occupies a small frequency, has a slow attenuation in the air, is applicable to long-distance transmission, and has a long detection distance, so the 76.5 GHZ band is the mainstream orientation of automotive radars.

Radar ranging is an important application of vehicle radar. However, the traditional 76.5 GHZ automotive radar is easy to be identified and forged by attackers, which causes wrong target range calculated by the automotive radar and thus safety accidents. In addition, in order to obtain high range resolution, the traditional ranging radar requires a high-speed analog-digital converter to convert an intermediate frequency signal into a digital signal, which is difficult to realize in specific implementation.

Therefore, in order to solve the above problems, the present disclosure provides a radar ranging system based on a true random generator and a ranging method thereof, which solves the problem that the existing vehicle-mounted radar system is vulnerable to attacks and thus leads to safety accidents.

SUMMARY

Purpose of the present disclosure: to overcome problems in the prior art, the technical problem to be solved by the disclosure is to improve the hardware structure of a radar ranging system based on a true random generator, as well as to improve the radar ranging method thereof.

To solve the technical problem described above, the present disclosure adopts the following technical scheme: a radar ranging system based on a true random generator, including a radar signal modulation and transmission unit and a radar signal receiving and processing unit, wherein the radar signal modulation and transmission unit includes a true random generator, the true random generator generates a true random binary sequence that is input and stored in a memory, and the memory cyclically outputs the true random binary sequence to a BPSK modulator;

The BPSK modulator uses the true random binary sequence to phase-modulate a carrier signal, and the phase-modulated carrier signal passes through a power amplifier and is transmitted by an transmitting antenna;

The carrier signal is a radar signal generated by an external clock source through a frequency multiplier and a power splitter;

The radar signal receiving and processing unit includes a receiving and amplifying unit, a down-sampling unit and a data processing unit, wherein the receiving and amplifying unit includes a low-noise amplifier and a receiving antenna, the receiving antenna receives the reflected radar signal, and the reflected radar signal has its signal-to-noise ratio improved by the low-noise amplifier and is input into a first mixer and a second mixer as a radio frequency signal;

Local oscillator (LO) signals of the first mixer and the second mixer are orthogonal signals generated by the carrier signal generated by the power splitter through a multiphase filter;

The down-sampling unit includes a first sample-and-hold circuit module, a second sample-and-hold circuit module, a frequency divider and a sampling clock generator, wherein the down-sampling unit divides the clock signal of the external clock source by the frequency divider and then inputs the signal into the sampling clock generator; an output signal of the sampling clock generator down samples the intermediate frequency signals generated by the first mixer and the second mixer;

The data processing unit includes an analog-digital converter, and the analog-digital converter converts the sampled analog signal into a digital signal that is cross-correlated with the true random binary sequence in the memory, so as to obtain the distance between the object reflecting the signal and the radar ranging system.

The true random binary sequence generated by the true random generator is stored in the memory, wherein the memory cyclically outputs the true random binary sequence to a BPSK modulator at a frequency of the external clock, and the BPSK modulator modulates the phase of a carrier signal through the true random binary sequence.

The radar signal modulation and transmission unit also includes a counter, wherein a signal input terminal of the counter is connected with a signal output terminal of the memory through a wire, and a signal output terminal of the counter is connected with a signal input terminal of the memory through a wire; the counter counts the times that the memory cyclically outputs true random binary sequences to the BPSK modulator, and when the counter counts a total number of true random binary sequences, the counter controls the true random generator to generate new true random binary sequences and to store them in the memory.

The down-sampling unit samples the intermediate frequency signals of the first mixer and the second mixer, and the clock of the down-sampling unit is a clock signal sized as $$\frac{\text{external clock source frequency}}{2^N}$$

generated by an external signal source and N frequency dividers (division by 2).

The number of true random binary sequences generated by the true random generator is calculated by the formula: $2^N-1$, where N is the number of frequency dividers (division by 2).

The data processing unit also includes an FHT module, and the FHT module performs cross-correlation on the true random binary sequence and the digital signal in the memory, and calculates the distance between the object reflecting the signal and the radar ranging system.

A method for ranging by a radar ranging system based on a true random generator is provided, including:

Step 1, an external clock source generates a carrier signal through a frequency multiplier, and at the same time, the external clock source transmits the clock signal to a true random generator;

Step 2, the true random generator generates a true random binary sequence according to the clock signal and stores the true random binary sequence in a memory;

Step 3, the carrier signal generated in Step 1 is input into a BPSK phase modulator through a power splitter, and at the same time the true random binary sequence stored in the memory in Step 2 is input into the BPSK phase modulator for phase modulation of the carrier signal;

Step 4, the phase-modulated carrier signal passes through a power amplifier and is transmitted to the measured object via an transmitting antenna, and the transmitted signal, after being reflected, is received through a receiving antenna;

Step 5, the reflected signal, after being received, is used as a received signal to improve the signal-to-noise ratio through a low-noise amplifier, and then is used as a radio frequency signal to be input into a mixer;

Step 6, the down-sampling unit down samples the intermediate frequency signal generated by the mixer, the sampled analog signal is converted into a digital signal through an analog-digital converter, and the digital signal is cross-correlated with the true random binary sequence in the memory to obtain the distance between the object reflecting the signal and the radar ranging system.

The carrier signal in Step 1 is calculated by the formula: $S_c(t) = a_c \cos(\omega_c t)$, where $a_c$ is the amplitude of the carrier signal, $\omega_c$ is the period of the carrier, $\omega_c = 2\pi f_c$, and $f_c$ is the frequency of the carrier signal;

The transmitted signal in Step 4 is calculated by the formula: $S_{TX}(t) = m(t) a_{TX} \cos(\omega_c t)$, where $a_{TX}$ is the amplitude of the transmitted signal after passing through the power amplifier, m(t) is the true random binary sequence, $$m(t) = \begin{cases} 1 & \text{corresponding code element is 1} \\ 0 & \text{corresponding code element is 0} \end{cases};$$

The received signal in Step 5 is calculated by the formula: $S_{TX}(t) = m(t-\tau_0) \alpha a_{TX} \cos(\omega_c(t-\tau_0)+\theta_R)$, where $\tau_0$ is the delay time of the signal from transmission to reception, $\alpha$ is the damping factor of signal loss due to the path and reflection, and $\theta_R$ is the extra phase shift caused by reflection;

The intermediate frequency signal generated by the mixer in Step 6 is calculated by the formula:

$$S_{IF}(t) = \frac{1}{2}\alpha a_{TX} a_{LO} m(t-\tau_0) \cdot \exp(j(\omega_c \tau_0 - \theta_R))$$

In the above formula, $a_{LO}$ is the amplitude of the LO signal.

In Step 6, the digital signal is cross-correlated with the true random binary sequence in the memory, and the calculation formula of radar detection range is as follows:

$$R_{ms}(\tau) = \frac{1}{T}\int_0^T m(t) S_{IF}(t+\tau) dt =$$

$$\frac{1}{2T}\alpha a_{TX} a_{LO} \cdot \exp(j(\omega_c \tau_0 - \theta_R)) \cdot \int_0^T m(t) \cdot m(t - \tau_0 + \tau) dt$$

In the above formula, T is the time required to generate $2^N-1$ true random binary sequences, and $\tau_0$ is the time when a pulse peak appears in the cross-correlation between the intermediate frequency signal and the true random binary sequence m(t), which is namely the delay time;

The resolution of radar is calculated by the formula:

$$\Delta \tau = \frac{1}{2} \times \frac{c}{f_c}$$

In the above formula, c is the speed of light in vacuum, and $f_c$ is the frequency of the carrier signal;

The maximum radar detection range is calculated by the formula:

$R = (2^N-1) \times \Delta\tau$, where $2^N-1$ is the number of true random binary sequences.

In comparison to the prior art, the present disclosure has the following beneficial effects: the radar ranging system provided by the present disclosure modulates the radar signal by the true random binary sequence generated by the true random generator, and encrypts the transmitted radar signal while ranging so as to prevent an attacker from attacking the radar system. At the same time, the present disclosure also reduces the speed of the required analog-digital converter by sampling the intermediate frequency signal with the down-sampling technology, thereby improving the safety of the radar signal, making the radar signal insusceptible to attacks by the recognizer, and improving the ranging resolution of radar ranging.

BRIEF DESCRIPTION OF THE DRAWINGS

The present disclosure will be further described with reference to accompanying figures below.

Figure 1:
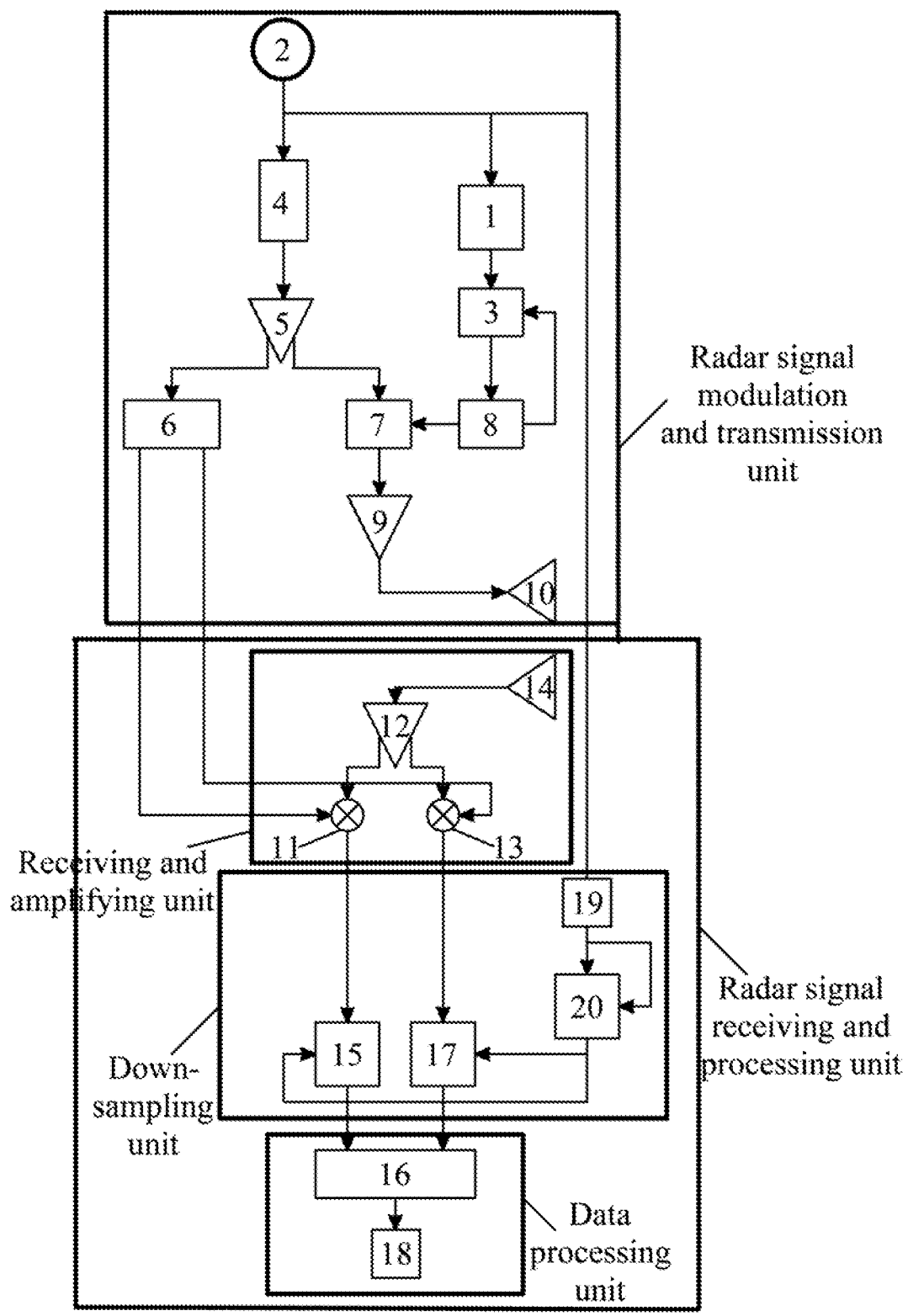
FIG. 1 is a structure schematic view according to the present disclosure.

Reference numerals in the figures: 1—true random generator, 2—external clock source, 3—memory, 4—frequency multiplier, 5—power splitter, 6—multiphase filter, 7—BPSK modulator, 8—counter, 9—power amplifier, 10—transmitting antenna, 11—first mixer, 12—low-noise amplifier, 13—second mixer, 14—receiving antenna, 15—first sample-and-hold circuit module, 16—analog-digital converter, 17—second sample-and-hold circuit module, 18—FHT module, 19—frequency divider, and 20—sampling clock generator.

DETAILED DESCRIPTION OF THE EMBODIMENTS

As shown in FIGS. 1 to 5, a radar ranging system based on a true random generator is provided, including a radar signal modulation and transmission unit and a radar signal receiving and processing unit, wherein the radar signal modulation and transmission unit includes a true random generator 1, the true random generator 1 generates a true random binary sequence that is input and stored in a memory 3, and the memory 3 cyclically outputs the true random binary sequence to a BPSK modulator 7;

The BPSK modulator 7 uses the true random binary sequence to phase-modulate a carrier signal, and the phase-modulated carrier signal passes through a power amplifier 9 and is transmitted by an transmitting antenna 10;

The carrier signal is a radar signal generated by an external clock source 2 through a frequency multiplier 4 and a power splitter 5;

The radar signal receiving and processing unit includes a receiving and amplifying unit, a down-sampling unit and a data processing unit, wherein the receiving and amplifying unit includes a low-noise amplifier 12 and a receiving antenna 14, the receiving antenna 14 receives the reflected radar signal, and the reflected radar signal has its signal-to-noise ratio improved by the low-noise amplifier 12 and is input into a first mixer 11 and a second mixer 13 as a radio frequency signal;

Local oscillator (LO) signals of the first mixer 11 and the second mixer 13 are orthogonal signals generated by the carrier signal generated by the power splitter 5 through a multiphase filter 6;

The down-sampling unit includes a first sample-and-hold circuit module 15, a second sample-and-hold circuit module 17, a frequency divider 19 and a sampling clock generator 20, wherein the down-sampling unit divides the clock signal of the external clock source 2 by the frequency divider 19 and then inputs the signal into the sampling clock generator 20; an output signal of the sampling clock generator 20 down samples the intermediate frequency signals generated by the first mixer 11 and the second mixer 13;

The data processing unit includes an analog-digital converter 16, and the analog-digital converter 16 converts the sampled analog signal into a digital signal that is cross-correlated with the true random binary sequence in the memory 3, so as to obtain the distance between the object reflecting the signal and the radar ranging system.

The true random binary sequence generated by the true random generator 1 is stored in the memory 3, wherein the memory 3 cyclically outputs the true random binary sequence to a BPSK modulator 7 at a frequency of the external clock, and the BPSK modulator 7 modulates the phase of a carrier signal through the true random binary sequence.

The radar signal modulation and transmission unit also includes a counter 8, wherein a signal input terminal of the counter 8 is connected with a signal output terminal of the memory 3 through a wire, and a signal output terminal of the counter 8 is connected with a signal input terminal of the memory 3 through a wire; the counter 8 counts the times that the memory 3 cyclically outputs true random binary sequences to the BPSK modulator 7, and when the counter 8 counts a total number of true random binary sequences, the counter 8 controls the true random generator 1 to generate new true random binary sequences and to store them in the memory 3.

The down-sampling unit samples the intermediate frequency signals of the first mixer 11 and the second mixer 13, and the clock of the down-sampling unit is a clock signal sized as $$\frac{\text{external clock source frequency}}{2^N}$$

generated by an external signal source and N frequency dividers (division by 2).

The number of true random binary sequences generated by the true random generator 1 is calculated by the formula: $2^N-1$, where N is the number of frequency dividers (division by 2).

The data processing unit also includes an FHT module 18, and the FHT module 18 performs cross-correlation on the true random binary sequence and the digital signal in the memory 3, and calculates the distance between the object reflecting the signal and the radar ranging system.

A method for ranging by a radar ranging system based on a true random generator is provided, including:
  Step 1, an external clock source 2 generates a carrier signal through a frequency multiplier 4, and at the same time, the external clock source 2 transmits the clock signal to a true random generator 1;
  Step 2, the true random generator 1 generates a true random binary sequence according to the clock signal and stores the true random binary sequence in a memory 3;
  Step 3, the carrier signal generated in Step 1 is input into a BPSK phase modulator 7 through a power splitter 5, and at the same time the true random binary sequence stored in the memory 3 in Step 2 is input into the BPSK phase modulator 7 for phase modulation of the carrier signal;
  Step 4, the phase-modulated carrier signal passes through a power amplifier 9 and is transmitted to the measured object via an transmitting antenna 10, and the transmitted signal, after being reflected, is received through a receiving antenna 14;
  Step 5, the reflected signal, after being received, is used as a received signal to improve the signal-to-noise ratio through a low-noise amplifier 12, and then is used as a radio frequency signal to be input into a mixer;
  Step 6, the down-sampling unit down samples the intermediate frequency signal generated by the mixer, the sampled analog signal is converted into a digital signal through an analog-digital converter 16, and the digital signal is cross-correlated with the true random binary sequence in the memory 3 to obtain the distance between the object reflecting the signal and the radar ranging system.

The carrier signal in Step 1 is calculated by the formula: $S_c(t)=a_c \cos(\omega_c t)$, where $a_c$ is the amplitude of the carrier signal, $\omega_c$ is the period of the carrier, $\omega_c=2f_c$, and $f_c$ is the frequency of the carrier signal;

The transmitted signal in Step 4 is calculated by the formula: $S_{TX}(t)=m(t)a_{TX} \cos(\omega_c t)$, where $a_{TX}$ is the amplitude of the transmitted signal after passing through the power amplifier 9, m(t) is the true random binary sequence, $$m(t) = \begin{cases} 1 & \text{corresponding code element is 1} \\ 0 & \text{corresponding code element is 0} \end{cases};$$

The received signal in Step 5 is calculated by the formula: $S_{TX}(t)=m(t-\tau_0)\alpha a_{TX}\cos(\omega_c t)$, where $\tau_0$ is the delay time of the signal from transmission to reception, a is the damping factor of signal loss due to the path and reflection, and $\theta_R$ is the extra phase shift caused by reflection;

The intermediate frequency signal generated by the mixer in Step 6 is calculated by the formula:

$$S_{IF}(t)=\tfrac{1}{2}\alpha a_{TX}a_{LO}m(t-\tau_0)\cdot\exp(j(\omega_c\tau_0-\theta_R))$$

In the above formula, $a_{LO}$ is the amplitude of the LO signal.

In Step 6, the digital signal is cross-correlated with the true random binary sequence in the memory 3, and the calculation formula of radar detection range is as follows:

$$R_{ms}(\tau) = \frac{1}{T}\int_0^T m(t)S_{IF}(t+\tau)dt =$$
$$\frac{1}{2T}\alpha a_{TX}a_{LO}\cdot\exp(j(\omega_c\tau_0-\theta_R))\cdot\int_0^T m(t)\cdot m(t-\tau_0+\tau)dt$$

In the above formula, T is the time required to generate $2^N-1$ true random binary sequences, and $\tau_0$ is the time when a pulse peak appears in the cross-correlation between the intermediate frequency signal and the true random binary sequence m(t), which is namely the delay time;

The resolution of radar is calculated by the formula:

$$\Delta\tau = \frac{1}{2}\times\frac{c}{f_c}$$

In the above formula, c is the speed of light in vacuum, and $f_c$ is the frequency of the carrier signal;

The maximum radar detection range is calculated by the formula:

$R=(2^N-1)\times\Delta\tau$, where $2^N-1$ is the number of true random binary sequences.

The radar ranging system and the ranging method thereof provided in the present disclosure solves the problem that the existing radar system is vulnerable to attacks and thus leads to safety accidents, and provides a safe radar system which can modulate and encrypt radar signals based on a true random generator and resist attackers.

The radar ranging system based on the true random generator according to the present disclosure mainly includes a true random generator 1, a memory 3, a counter 8, a power splitter 5, a BPSK modulator 7, a multiphase filter 6, a mixer, a down-sampling unit, an analog-digital converter 16 and an external clock source 2, a frequency divider 19 and a frequency multiplier 4.

The true random binary sequence generated by the true random generator 1 is input and stored in the memory 3, wherein the memory 3 cyclically outputs the true random binary sequence to the BPSK modulator 7. The BPSK modulator 7 modulates the phase of a carrier signal by using the true random binary sequence. The carrier signal is a radar signal generated by the external clock source 2 through the frequency multiplier 4 and the power splitter 5.

The counter 8 counts the number of times that the memory 3 cyclically outputs the true random binary sequence to the BPSK modulator 7.

The phase-modulated carrier signal, after passing through the power amplifier 9, is transmitted by the transmitting antenna 10, then reflected, and received by the receiving antenna 14. After the signal-to-noise ratio is improved by the low-noise amplifier 12, the carrier signal is input into the mixer as a radio frequency signal. The LO signal of the mixer is an orthogonal signal generated by the carrier signal generated by the power splitter 5 through the multiphase filter 6.

The down-sampling unit down samples the intermediate frequency signal generated by the mixer, and the sampled analog signal is converted into a digital signal by the analog-digital converter 16. The digital signal is cross-correlated with the true random binary sequence in the memory 3, so as to obtain the distance between the object reflecting the signal and the system.

The embodiment of the present disclosure is described in detail by taking a 76.5 GHZ vehicle-mounted radar ranging system as the example: 4095 binary true random sequences generated by the true random generator 1 are stored in the memory 3 and cyclically output to the BPSK phase modulator 7 at a frequency of 4.25 GHZ for phase modulation of carrier signals.

The counter 8 counts the times that the memory 3 cyclically outputs true random binary sequences to the BPSK modulator 7, and when the counter 8 counts to 4095, the counter 8 controls the true random generator 1 to generate 4095 new true random binary sequences and to store them in the memory 3.

The down-sampling unit performs sampling under the control of the 4.25 GHZ external signal source 2 and 12 clock signals generated by the frequency divider (division by 2).

The FHT module 18 performs cross-correlation on the true random binary sequence and the digital signal in the memory 3, and calculates the distance between the object reflecting the signal and the system.

Figure 2:
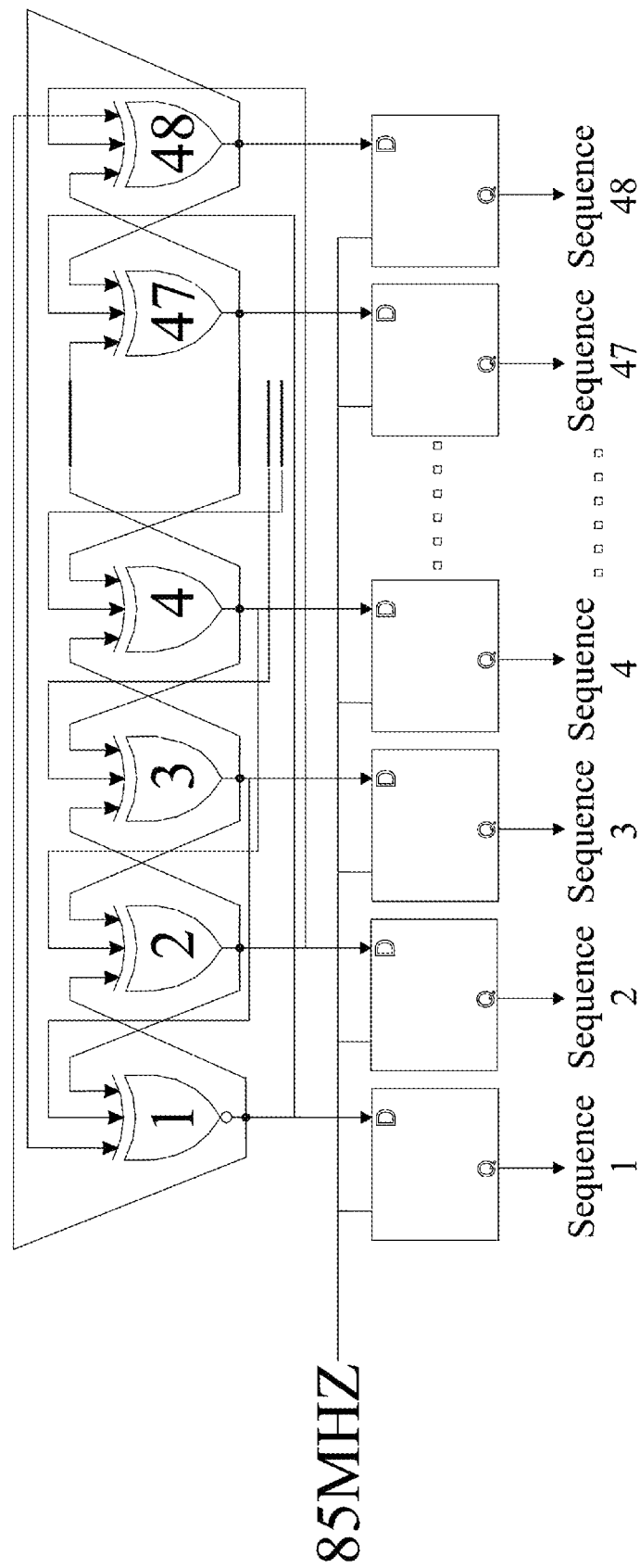
FIG. 2 is a structural diagram based on a 48-node Boolean network true random generator according to an embodiment of the present disclosure.

An entropy source module and an entropy extraction module of the true random generator 1 are as shown in FIG. 2. The entropy source module consists of 48 logic gate nodes. Node 1 performs XNOR operation, and nodes 2 to 48 perform XOR logic operation. At the same time, each node is a three-input and three-output logic gate, there are bidirectional input and output between adjacent nodes, and there are input and output links between spaced nodes. For example, node 1 is adjacent to node 2 and node 48, so there are bidirectional input and output between node 1 and node 2, and between node 1 and node 48. Node 1 is separated from node 3 and node 47, so node 3 outputs to node 1 and node 1 outputs to node 47. 48 nodes are used as output terminals to output or collect signals, and the entropy extraction circuit is composed of only one D flip-flop. The clock signal is used to control inputting the entropy source signal at the clock terminal to the input terminal so as to realize the sampling of the entropy source signal. The clock is a 4.25 GHZ external clock source and 85 MHZ clock signals generated by one frequency divider (division by 2) and two 5 frequency dividers (division by 5).

Figure 3:
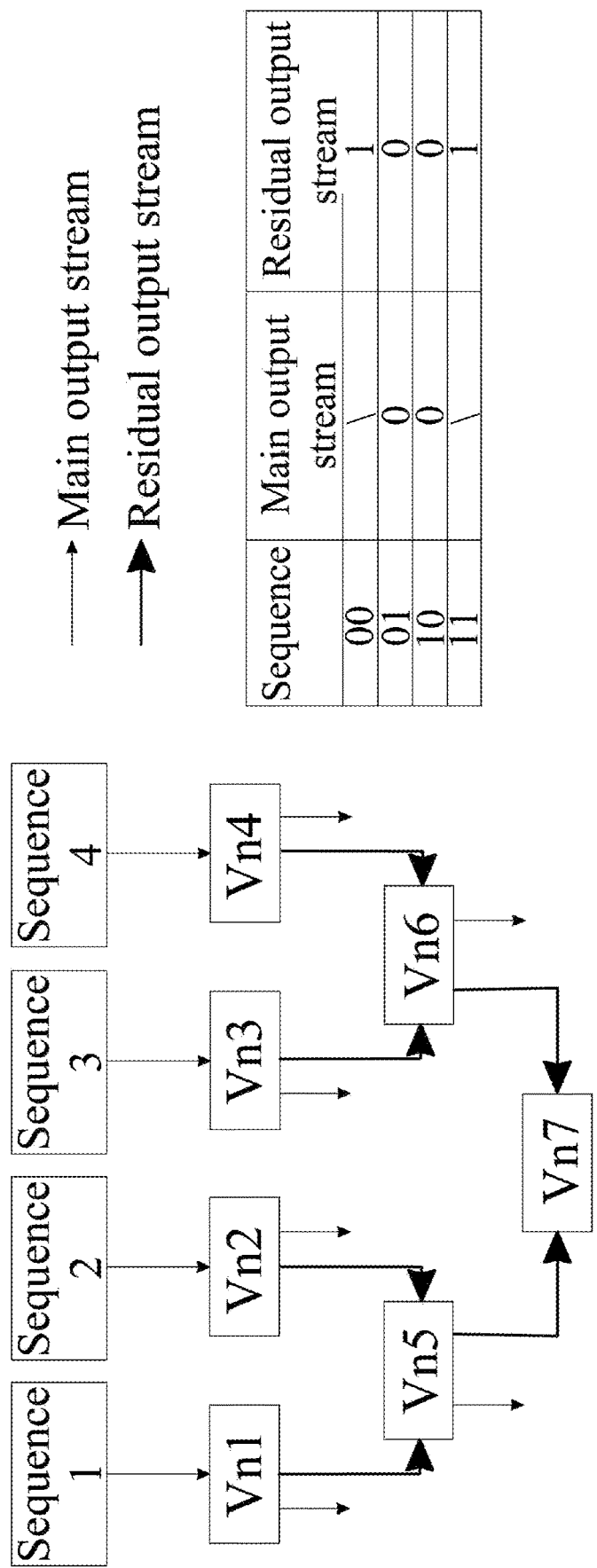
FIG. 3 is a schematic diagram of a Von Neumann processing circuit according to an embodiments of the present disclosure.
Figure 4:
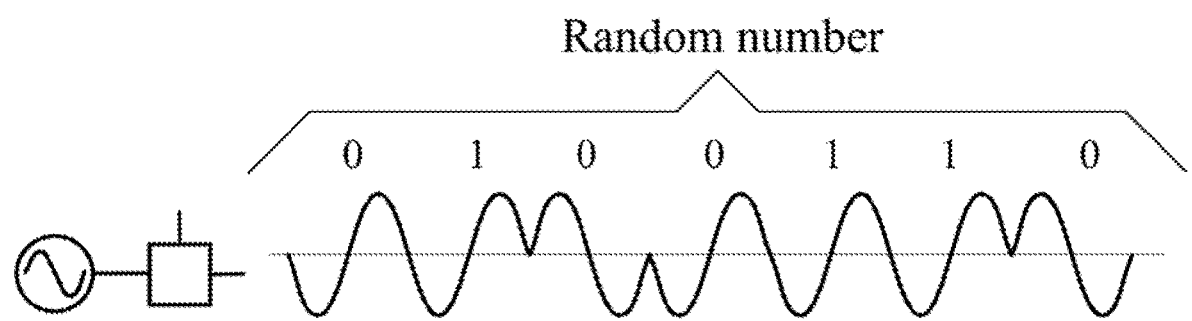
FIG. 4 is a working principle diagram of a phase modulator according to an embodiments of the present disclosure.

The entropy extraction circuit extracts 48 routes of binary sequences from the entropy source, and inputs them into the Von Neumann processing circuit for post-processing. In order to reduce the influence of post-processing on the random number generation rate, the Von Neumann extractor structure is adopted. As shown in FIG. 3, if two adjacent binary numbers are different, namely "10" or "01", the output is "1" or "0" in the main output stream. "1" is output in the residual output stream. If two adjacent binary numbers are identical, namely "11" or "00", they will not be output in the main output streams, and "0" will be output in the residual output streams. Then the two residual output streams will be input to a Von Neumann processing circuit for processing, and so on.

As shown in FIG. 1, the signal input terminal of the true random generator 1 is connected with the external clock source 2 through a wire, and the signal output terminal of the true random generator 1 is connected with the signal input terminal of the memory 3 through a wire. The external clock source 2 is also connected with the signal input terminals of the frequency multiplier 4 and the frequency divider 19 through wires, the signal output terminal of the frequency multiplier 4 is connected with the input terminal of the power splitter 5 through a wire, the first signal output terminal of the power splitter 5 is connected with the signal input terminal of the multiphase filter 6 through wires, and the second signal output terminal of the power splitter 5 is connected with the signal input terminal of the BPSK modulator 7 through a wire. The signal output terminal of the memory 3 is connected with the signal input terminals of the BPSK modulator 7 and the counter 8 respectively through wires, and the signal output terminal of the counter 8 is connected with the signal input terminal of the memory 3 through a wire.

The true random binary sequence generated by the true random generator 1 is input and stored in the memory 3, wherein the memory 3 cyclically outputs the true random binary sequence to the BPSK modulator 7. The BPSK modulator 7 modulates the phase of a carrier signal by using the true random binary sequence. The carrier signal is a vehicle-mounted radar signal generated by the external clock source 2 through the frequency multiplier 4 and the power splitter 5. The counter 8 counts the number of times that the memory 3 cyclically outputs the true random binary sequence to the BPSK modulator 7.

The signal output terminal of the BPSK modulator 7 is connected with the signal input terminal of the power amplifier 9 through a wire, and the signal output terminal of the power amplifier 9 is connected with the transmitting antenna 10 through a wire. The first signal output terminal of the multiphase filter 6 is connected with the signal input terminal of the first mixer 11 through a wire, and the signal input terminal of the first mixer 11 is also connected with the first signal output terminal of the low-noise amplifier 12 through a wire. The second signal output terminal of the multiphase filter 6 is connected with the signal input terminal of the second mixer 13 through a wire, and the signal input terminal of the second mixer 13 is also connected with the second signal output terminal of the low noise amplifier 12 through a wire. The signal input terminal of the low noise amplifier 12 is connected with the receiving antenna 14 through a wire. The wire of the signal output terminal of the first mixer 11 is connected with the signal input terminal of the analog-digital converter 16 through the first sample-and-hold circuit module 15, and the wire of the signal output terminal of the second mixer 13 is connected with the signal input terminal of the analog-digital converter 16 through the second sample-and-hold circuit module 17. The signal output terminal of the analog-digital converter 16 is connected with the FHT module 18 through a wire. The signal output terminal of the frequency divider 19 is connected with the signal input terminal of the sampling clock generator 20 through a wire. The signal output terminal of the sampling clock generator 20 is respectively connected with the signal input terminals of the first sample-and-hold circuit module 15 and the second sample-and-hold circuit module 17 through wires.

As shown in FIG. 1, the external clock source 2, specifically a 4.25 GHZ external clock source, generates a 76.5 GHZ signal through one frequency multiplier (by 2 times) and two frequency multipliers (by 3 times), and the signal is divided into two identical signals by a power splitter 5, with one signal of which is output to the BPSK phase modulator 7 as a carrier signal.

The carrier signal is calculated by the expression: $S_c(t)=a_c \cos(\omega_c t)$, where $a_c$ is the amplitude of the carrier signal, $\omega_c$ is the period of the carrier, $\omega_c=2\pi f_c$, and $f_c=4.25$ GHZ.

The true random generator 1 generates 4095 true random numbers and outputs them to the memory 3 for storage. The memory 3 cyclically outputs these 4095 binary numbers to the BPSK phase modulator 7 at a frequency of 4.25 GHZ. The counter 8 records the number of times that the memory 3 cyclically outputs the 4095 binary numbers to the BPSK phase modulator 7. When the counter 8 counts to 4095, the counter 8 controls the true random generator 1 to generate new true random numbers and store them in the memory 3 to proceed for the above operations.

Figure 5:
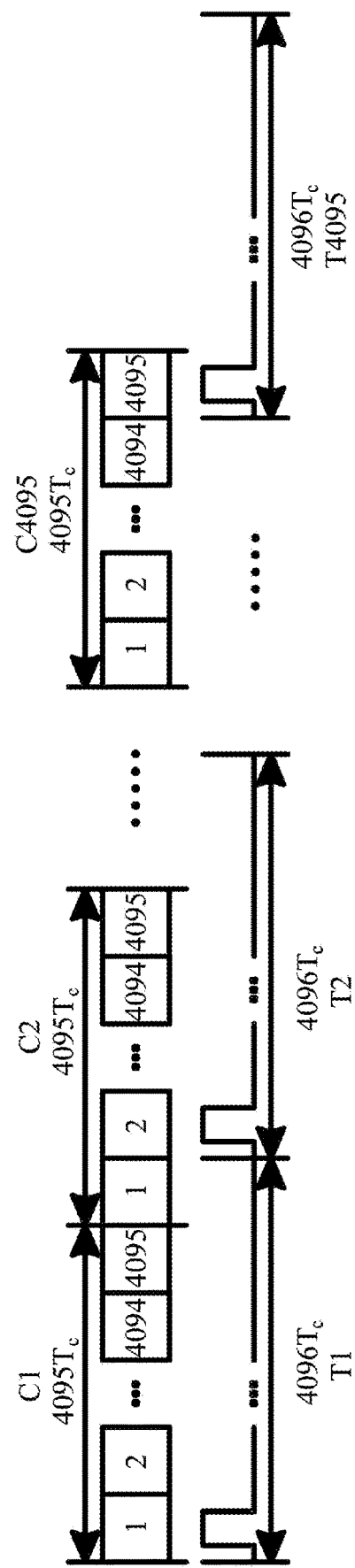
FIG. 5 is a working principle diagram of a down-sampling unit according to an embodiment of the present disclosure.

The BPSK modulator 7 performs BPSK-modulation on the carrier signal by using the above-mentioned 4095 cyclic binary numbers with a frequency of 4.25 GHZ as code elements. As shown in FIG. 5, when a code element corresponding to a cycle of the carrier signal is 1, it does not change in phase. When the code element corresponding to a cycle of periodic carrier signal is 0, it shifts in phase by 180°.

The phase-modulated carrier signal, after passing through the power amplifier 9, is transmitted by the transmitting antenna 10, then reflected, and received by the receiving antenna 14. After the signal-to-noise ratio is improved by the low-noise amplifier 12, the carrier signal is input into the first mixer 11 and the second mixer 13 as a radio frequency signal. The LO signal of the first mixer 11 and the second mixer 13 is an orthogonal signal generated by the 76.5 GHZ signal, that is identical with the carrier signal, generated by the power splitter 5 through the multiphase filter 6.

The transmitted signal has the expression: $S_{TX}(t)=m(t)a_{TX} \cos(\omega_c t)$, where $a_{TX}$ is the amplitude of the signal transmitted after passing through the power amplifier, m(t) is the true random sequence, $$m(t) = \begin{cases} 1 & \text{corresponding code element is 1} \\ 0 & \text{corresponding code element is 0} \end{cases};$$

The received signal is calculated by the expression: $S_{TX}(t)=m(t-\tau_0)\alpha a_{TX} \cos(\omega_c(t-\tau_0)+\theta_R)$, where $\tau_0$ is the delay time of the signal from transmission to reception, a is the damping factor of signal loss due to the path and reflection, and OR is the extra phase shift caused by reflection.

The expression of the intermediate frequency signal generated by the mixer is) $S_{IF}(t)=\frac{1}{2}\alpha a_{TX} a_{LO} m(t-\tau_0) \cdot \exp(j(\omega_c \tau_0 - \theta_R))$, wherein $a_{LO}$ is the amplitude of the LO signal.

As shown in FIG. 5, the down-sampling unit down samples the intermediate frequency signal generated by the mixer. Since the binary numbers used by the BPSK modulator 7 are 4095 true random numbers generated by the true random generator 1 and cyclically output by the memory 3 at a rate of 4.25 Gbit/s, and the down-sampled clock signal is at a frequency of $$\frac{4.25}{4096} \text{GHZ},$$

so when the first clock samples the first number among 4095 binary sequences, the second clock will sample the second number among the 4095 binary sequences, and so on until the 4095th clock samples the 4095th number among the 4095 binary sequences. When the first clock samples the $i^{th}(i \geq 1)$ number among the 4095 binary sequences, the second clock samples the $i+1^{th}$ number among the 4095 binary sequences, and so on until the $4096\text{-}i^{th}$ clock samples the 4095th number among the 4095 binary sequences, the $4097\text{-}i^{th}(i>1)$ clock samples the $1^{st}$ number among the 4095 binary sequences, the $4095^{th}$ clock samples the number among the 4095 binary sequences. Therefore, 4095 binary numbers can be all sampled by controlling the input of 4095 down-sampling clocks. At this time, the required speed of the analog-digital converter becomes $$\frac{4.25\, \text{GHZ}}{4096} = 1.04\, \text{MHZ}$$

which greatly reduced the required speed of the analog-digital converter 16.

By cross-correlating the digital signal and true random sequence m(t), we get:

$$R_{ms}(\tau) = \frac{1}{T}\int_0^T m(t)S_{IF}(t+\tau)dt =$$

$$\frac{1}{2T}\alpha a_{TX}a_{LO} \cdot \exp(j(\omega_c \tau_0 - \theta_R)) \cdot \int_0^T m(t) \cdot m(t - \tau_0 + \tau)dt$$

In the above formula, T is the time required to generate 4095 true random binary sequences, and the time when a pulse peak appears in the cross-correlation between the intermediate frequency signal and m(t) is namely the delay time $\tau_0$.

The sampled analog signal is converted into a digital signal by an analog-digital converter 16, and the digital signal is cross-correlated with the true random binary sequence in the memory 3 by the FHT module 18 to obtain the distance between the object reflecting the signal and the system.

The resolution of that 76.5 GHZ vehicle-mounted radar in the embodiment of the present disclosure is as follow:

$$\Delta\tau = \frac{1}{2} \times \frac{c}{f_c} = \frac{1}{2} \times \frac{e \times 10^8 \text{m/s}}{4.25\, \text{GHZ}} = 3.5\, \text{cm}.$$

The maximum radar detection range: $R = 4095 \times \Delta\tau = 144.5$ m.

With regard to the specific structure of the present disclosure, it is necessary to explain that the connection relationship between various components and modules adopted in the present disclosure is established and feasible, and such a specific connection relationship may give rise to corresponding technical effects unless specifically stated in the embodiment, and solve the technical problems proposed by the present disclosure without depending on the execution of corresponding software applications. Models and connection modes of components, modules and specific components mentioned in the present disclosure, unless specifically stated, are all belong to the technologies in the prior art such as published patents, published periodical papers or common knowledge that can be obtained by the technical personnel in this field before the application date, which are not necessary to be repeated herein, so that the technical schemes provided in the present disclosure is clear, complete and feasible, thus enabling reproduction or acquisition of corresponding physical products according to such technical means.

Finally, it is noted that the above embodiments are all only for the purpose of illustrating the technical scheme of the present disclosure without limiting it. Although a detailed specification is given for the present disclosure by reference to each of above-mentioned embodiments, those of ordinary skills in the art should understand that he/she can still perform modifications on the technical schemes described in the above embodiments, or equivalent replacement of some or all technical features from the technical schemes. However, such modifications or replacement do not make the corresponding technical schemes depart in nature from the scope of those in each embodiment of the present disclosure.

What is claimed is:

1. A radar ranging system based on a true random generator, comprising a radar signal modulation and transmission unit and a radar signal receiving and processing unit, wherein the radar signal modulation and transmission unit includes a true random generator (1), the true random generator (1) generates a true random binary sequence that is input and stored in a memory (3), and the memory (3) cyclically outputs the true random binary sequence to a BPSK modulator (7);

The BPSK modulator (7) uses the true random binary sequence to phase-modulate a carrier signal, and the phase-modulated carrier signal passes through a power amplifier (9) and is transmitted by an transmitting antenna (10);

The carrier signal is a radar signal generated by an external clock source (2) through a frequency multiplier (4) and a power splitter (5);

The radar signal receiving and processing unit includes a receiving and amplifying unit, a down-sampling unit and a data processing unit, wherein the receiving and amplifying unit includes a low-noise amplifier (12) and a receiving antenna (14), the receiving antenna (14) receives the reflected radar signal, and the reflected radar signal has its signal-to-noise ratio improved by the low-noise amplifier (12) and is input into a first mixer (11) and a second mixer (13) as a radio frequency signal;

Local oscillator (LO) signals of the first mixer (11) and the second mixer (13) are orthogonal signals generated by the carrier signal generated by the power splitter (5) through a multiphase filter (6);

The down-sampling unit includes a first sample-and-hold circuit module (15), a second sample-and-hold circuit module (17), a frequency divider (19) and a sampling clock generator (20), wherein the down-sampling unit divides the clock signal of the external clock source (2) by the frequency divider (19) and then inputs the signal into the sampling clock generator (20); an output signal of the sampling clock generator (20) down samples the intermediate frequency signals generated by the first mixer (11) and the second mixer (13);

The data processing unit includes an analog-digital converter (16), and the analog-digital converter (16) converts the sampled analog signal into a digital signal that is cross-correlated with the true random binary sequence in the memory (3), so as to obtain the distance between the object reflecting the signal and the radar ranging system.

2. The radar ranging system based on the true random generator according to claim 1, wherein the true random binary sequence generated by the true random generator (1) is stored in the memory (3), wherein the memory (3) cyclically outputs the true random binary sequence to a BPSK modulator (7) at a frequency of the external clock, and the BPSK modulator (7) modulates the phase of a carrier signal through the true random binary sequence.

3. The radar ranging system based on the true random generator according to claim 2, wherein the radar signal modulation and transmission unit also includes a counter (8), wherein a signal input terminal of the counter (8) is connected with a signal output terminal of the memory (3) through a wire, and a signal output terminal of the counter (8) is connected with a signal input terminal of the memory (3) through a wire; the counter (8) counts the times that the memory (3) cyclically outputs true random binary sequences to the BPSK modulator (7), and when the counter (8) counts a total number of true random binary sequences, the counter (8) controls the true random generator (1) to generate new true random binary sequences and to store them in the memory (3).

4. The radar ranging system based on the true random generator according to claim 3, wherein the down-sampling unit samples the intermediate frequency signals of the first mixer (11) and the second mixer (13), and the clock of the down-sampling unit is a clock signal sized as $$\frac{\text{external clock source frequency}}{2^N}$$

generated by an external signal source (2) and N frequency dividers (division by 2).

5. The radar ranging system based on the true random generator according to claim 4, wherein the number of true random binary sequences generated by the true random generator (1) is calculated by the formula: $2^N-1$, where N is the number of frequency dividers (division by 2).

6. The radar ranging system based on the true random generator according to claim 5, wherein the data processing unit also includes an FHT module (18), and the FHT module (18) performs cross-correlation on the true random binary sequence and the digital signal in the memory (3), and calculates the distance between the object reflecting the signal and the radar ranging system.

7. A method for ranging by a radar ranging system based on a true random generator is provided, comprising:
Step 1, an external clock source (2) generates a carrier signal through a frequency multiplier (4), and at the same time, the external clock source (2) transmits the clock signal to a true random generator (1);
Step 2, the true random generator (1) generates a true random binary sequence according to the clock signal and stores the true random binary sequence in a memory (3);
Step 3, the carrier signal generated in Step 1 is input into a BPSK phase modulator (7) through a power splitter (5), and at the same time the true random binary sequence stored in the memory (3) in Step 2 is input into the BPSK phase modulator (7) for phase modulation of the carrier signal;

Step 4, the phase-modulated carrier signal passes through a power amplifier (9) and is transmitted to the measured object via an transmitting antenna (10), and the transmitted signal, after being reflected, is received through a receiving antenna (14);
Step 5, the reflected signal, after being received, is used as a received signal to improve the signal-to-noise ratio through a low-noise amplifier (12), and then is used as a radio frequency signal to be input into a mixer;
Step 6, the down-sampling unit down samples the intermediate frequency signal generated by the mixer, the sampled analog signal is converted into a digital signal through an analog-digital converter (16), and the digital signal is cross-correlated with the true random binary sequence in the memory (3) to obtain the distance between the object reflecting the signal and the radar ranging system.

8. The method for ranging by the radar ranging system based on the true random generator according to claim 7, wherein:
The carrier signal in Step 1 is calculated by the formula: $S_c(t)=a_c \cos(\omega_c t)$, where $a_c$ is the amplitude of the carrier signal, $\omega_c$ is the period of the carrier, $\omega_c=2\pi f_c$, and $f_c$ is the frequency of the carrier signal;
The transmitted signal in Step 4 is calculated by the formula: $S_{TX}(t)=m(t)a_{TX} \cos(\omega_c t)$, where $a_{TX}$ is the amplitude of the transmitted signal after passing through the power amplifier (9), m(t) is the true random binary sequence, $$m(t) = \begin{cases} 1 & \text{corresponding code element is 1} \\ 0 & \text{corresponding code element is 0} \end{cases};$$

The received signal in Step 5 is calculated by the formula: $S_{TX}(t)=m(t-\tau_0)\alpha a_{TX} \cos(\omega_c(t-\tau_0)+\theta_R)$, where $\tau_0$ is the delay time of the signal from transmission to reception, a is the damping factor of signal loss due to the path and reflection, and $\theta_R$ is the extra phase shift caused by reflection;
The intermediate frequency signal generated by the mixer in Step 6 is calculated by the formula:

$$S_{IF}(t)=\tfrac{1}{2}\alpha a_{TX}a_{LO}m(t-\tau_0)\cdot\exp(j(\omega_c\tau_0-\theta_R))$$

In the above formula, $a_{LO}$ is the amplitude of the LO signal.

9. The method for ranging by the radar ranging system based on the true random generator according to claim 8, wherein:
In Step 6, the digital signal is cross-correlated with the true random binary sequence in the memory (3), and the calculation formula of radar detection range is as follows:

$$R_{ms}(\tau) = \frac{1}{T}\int_0^T m(t)S_{IF}(t+\tau)dt = \\ \frac{1}{2T}\alpha a_{TX}a_{LO}\cdot\exp(j(\omega_c\tau_0-\theta_R))\cdot\int_0^T m(t)\cdot m(t-\tau_0+\tau)dt,$$

In the above formula, T is the time required to generate $2^N-1$ true random binary sequences, and $\tau_0$ is the time when a pulse peak appears in the cross-correlation between the intermediate frequency signal and the true random binary sequence m(t), which is namely the delay time;

The resolution of radar is calculated by the formula:

$$\Delta \tau = \frac{1}{2} \times \frac{c}{f_c}$$

In the above formula, c is the speed of light in vacuum, and $f_c$ is the frequency of the carrier signal;

The maximum radar detection range is calculated by the formula:

$R=(2^N-1) \times \Delta\tau$, where $2^N-1$ is the number of true random binary sequences.

* * * * *